US010482212B2

(12) United States Patent
Qin et al.

(10) Patent No.: US 10,482,212 B2
(45) Date of Patent: Nov. 19, 2019

(54) AUTOMATED RESISTANCE AND CAPACITANCE EXTRACTION AND NETLIST GENERATION OF LOGIC CELLS

(71) Applicant: Synopsys, Inc., Mountain View, CA (US)

(72) Inventors: Zudian Qin, Cupertino, CA (US); Karim El Sayed, Santa Clara, CA (US); Victor Moroz, Saratoga, CA (US); Xi-Wei Lin, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 57 days.

(21) Appl. No.: 15/901,749

(22) Filed: Feb. 21, 2018

(65) Prior Publication Data

US 2018/0239857 A1    Aug. 23, 2018

Related U.S. Application Data

(60) Provisional application No. 62/511,306, filed on May 25, 2017, provisional application No. 62/462,863, filed on Feb. 23, 2017.

(51) Int. Cl.
  *G06F 17/50*      (2006.01)
  *H01L 27/02*     (2006.01)
(52) U.S. Cl.
  CPC ...... *G06F 17/5072* (2013.01); *G06F 17/5009* (2013.01); *G06F 17/5036* (2013.01);
  (Continued)
(58) Field of Classification Search
  CPC ............. G06F 17/5072; G06F 17/5036; G06F 17/5045; G06F 17/5081; G06F 17/5009;
  (Continued)

(56) References Cited

U.S. PATENT DOCUMENTS 5,754,826 A        5/1998   Gamal et al.
5,828,580 A  *   10/1998   Ho ....................... G06F 17/5081
                                                                             716/115
(Continued)

OTHER PUBLICATIONS

Singer, "Coventor Wins 'Best of West' Award," http://electroiq.com/blog/2016/07/solid-state-technology-and-semi-announce-the-2016-best-of-west-award-winner/, Extension Media (2018), accessed Jan. 30, 2018, 8 pages.

(Continued)

*Primary Examiner* — Naum Levin
(74) *Attorney, Agent, or Firm* — Haynes Beffel & Wolfeld LLP

(57) ABSTRACT

Disclosed is technology for evaluating the performance, power, area, and cost of a new or significantly modified IC fabrication process. A layout of a circuit design is provided, the circuit design including pins, transistors, and interconnects. The interconnects have at least two endpoints, each of the endpoints being either a terminal of a transistor or a pin in the circuit design. The locations for a plurality of transistor and interconnect endpoints in the layout are identified. A three-dimensional circuit representation is fabricated in accordance with the layout and the fabrication process. Parasitic resistance and capacitance values are estimated for pairs of interconnect endpoints which share an interconnect in the three-dimensional circuit representation. An annotated netlist is developed for the plurality of the transistors interconnects endpoints identified from the layout, and which further indicates the parasitic resistance values and parasitic capacitance values estimated from the three-dimensional circuit representation.

39 Claims, 15 Drawing Sheets

(52) U.S. Cl.
CPC ...... *G06F 17/5045* (2013.01); *G06F 17/5081* (2013.01); *H01L 27/0207* (2013.01); *G06F 17/5077* (2013.01); *G06F 2217/12* (2013.01)

(58) Field of Classification Search
CPC ............. G06F 17/5077; G06F 2217/12; H01L 27/0207
See application file for complete search history.

(56) References Cited

U.S. PATENT DOCUMENTS

| | | | |
|---|---|---|---|
| 7,818,698 B2 * | 10/2010 | Su | G01R 31/2853 257/48 |
| 8,225,248 B2 * | 7/2012 | Chen | G01R 31/31704 716/106 |
| 8,464,198 B1 | 6/2013 | Chakravarty | |
| 8,490,244 B1 * | 7/2013 | Joshi | G06F 17/5068 716/110 |
| 8,595,663 B1 * | 11/2013 | Lu | G06F 17/5081 716/110 |
| 8,631,371 B2 * | 1/2014 | Lu | G06F 17/5036 716/110 |
| 8,700,377 B2 | 4/2014 | Bolcato et al. | |
| 8,966,430 B1 | 2/2015 | Iyer et al. | |
| 9,223,912 B1 * | 12/2015 | Liapis | G06F 17/5081 |
| 9,323,870 B2 * | 4/2016 | Chandra | G06F 17/50 |
| 9,471,738 B2 * | 10/2016 | Chou | G06F 17/5081 |
| 10,311,200 B2 * | 6/2019 | Moroz | G06F 17/5036 |
| 2015/0379174 A1 | 12/2015 | Chang et al. | |

OTHER PUBLICATIONS

Grimblatt, "Digital IC Design," Synopsys, Inc., 2012, 152 pages.
Synopsys Datasheet, Sentaurus TCAD, Industry-Standard Process and Device Simulators, Datasheet (2012), 4 pages.

* cited by examiner

```
.subckt INV IN OUT VDD VSS
mp1 p1d p1g p1s VDD pmos1 nfin=4 l=0.016u w=0.008u
mn1 n1d n1g n1s VSS nmos1 nfin=4 l=0.016u w=0.008u
.include RCX.spi
.ends INV
```

FIG. 8

```
* Linked RC netlist:
* SPICE Models for Resistance (Ohm)
R_0_1                   VDD    p1s    5.0612e+00
R_2_3                   n1g    p1g    1.3832e+01
R_4_3                   IN     p1g    2.1143e+01
R_5_6                   n1d    p1d    2.8309e+00
R_5_7                   n1d    OUT    1.4198e+01
R_7_6                   OUT    p1d    6.3095e+00
R_4_2                   IN     n1g    2.1438e+01
R_8_9                   VSS    n1s    4.9870e+00
* SPICE Models for Capacitance (F)
C_7_8                   OUT    VSS    7.6105e-17
C_0_4                   VDD    IN     2.1496e-16
C_0_7                   VDD    OUT    4.8401e-17
C_4_7                   IN     OUT    3.6183e-16
C_0_8                   VDD    VSS    6.5880e-17
C_8_4                   VSS    IN     2.3625e-16
```

FIG. 10

AUTOMATED RESISTANCE AND CAPACITANCE EXTRACTION AND NETLIST GENERATION OF LOGIC CELLS

CROSS-REFERENCE TO OTHER APPLICATIONS

This application claims priority under 35 U.S.C. § 119(e) to U.S. Provisional Application No. 62/462,863 filed on Feb. 23, 2017 and U.S. Provisional Application No. 62/511,306 filed on May 25, 2017.

FIELD OF THE INVENTION

This invention relates to the modeling of integrated circuit devices and more particularly to the modeling of integrated circuit devices in computer-aided design (CAD) and electronic design automation (EDA) systems.

BACKGROUND

An integrated circuit (IC) is a set of electronic circuits that integrates a large number of semiconducting transistors into a small chip. Among the most advanced integrated circuits are microprocessors, memory chips, programmable logic sensors, power management circuits, etc. Advances in IC technology have led to size reduction of transistors, enabling greater densities of devices and circuits in IC chips and enhanced performance.

The fabrication of an IC chip involves a lengthy and detailed series of exacting process steps, including such steps as lithography, doping, etching, chemical mechanical polishing, and the like. Manufacturers are constantly updating their processes or developing new ones, and it is rarely obvious how a small change in the recipe will affect the performance of integrated circuits made using the new recipe. Usually, test structures are fabricated using the new process, and these structures are evaluated by observing their features and performance. Process engineers then revise the recipe further and try again. But fabrication can be costly and time-consuming, and thus cannot be performed as often during process development as would be desired. Some aspects of the evaluation can be performed by simulation, in a technique sometimes referred to herein as Design Technology Co-Optimization (DTCO). However, many needed aspects of the evaluation still require physical fabrication of test structures.

All circuit elements in a library cell such as interconnect, diodes, and transistors have internal parasitic capacitance and resistance, which can cause their behavior to depart from that of 'ideal' circuit elements. As transistors are scaled down in size, the overall parasitic capacitance in the IC increases as the space between neighboring devices decreases to tens of nanometers to pack more computing power into smaller spaces. Small contact size between source/drain and interconnects leads to higher contact resistance and contact-to-gate capacitance. Therefore the parasitic effect is an important metric in the evaluation of future transistor and electronic devices.

A goal of DTCO is to obtain a power-performance-area evaluation of a circuit design, based on the layout of the circuit design and a description of the process flow under test, early in the development of the fabrication process, before physical test structures are readily available. The evaluation still involves a SPICE model of the transistors in the cell, but typically this model is extracted only for a nominal transistor. It does not account for parasitic resistance and capacitance of interconnects in the layout, which can contribute large variations in the performance of the circuit. The values for the parasitic resistance and capacitance in the SPICE model for the nominal transistor can differ significantly from actual parasitic resistance and capacitance. Such differences can arise because each interconnect in the circuit design has different surroundings, physical locations in the circuit design layout, loads, fan-in, and so on. For timing analysis of the library cell, it is important that timing delays and parasitic resistances and capacitances associated with the circuit components in the netlist be accurate.

SUMMARY

Roughly described, a system and method are provided that can be used for verification of circuit designs early in the development of a new or modified fabrication process. A layout is provided of a circuit design, the circuit design including at least one electronic device (e.g. a transistor, diode or capacitor), at least one conductor, at least one of the conductors being an interconnect, each of the interconnects having at least two endpoints, each of the endpoints being either a terminal of an electronic device of the circuit design or a pin of the circuit design. The circuit design may, for example, be a library cell that contains any number of electronic devices, though it is preferred that it contains from 2 to about 40 electronic devices. The system identifies, from the layout, the locations in the layout of all electronic devices, and all the interconnect endpoints, such as device terminals and pins. The system develops a nominal netlist in dependence upon the identified electronic devices, device terminals, and pins. The system also synthesizes, using a fabrication process emulation tool, a 3-D representation of the circuit design fabricated in accordance with the layout and the fabrication process under test. The represented device includes at least the interconnects, but may also include electronic devices. The system estimates, for example using a field solver tool, parasitic resistance and parasitic capacitance values of each of the interconnects. The system combines the nominal netlist with the parasitic resistance and parasitic capacitance values estimated for each of interconnects to develop an annotated netlist that includes all of the electronic devices and pins identified from the layout and all of the interconnects identified from the layout, and which further indicates the parasitic resistance and parasitic capacitance values estimated from the device representation. This corrected netlist then can be used in a circuit simulator such as HSPICE to verify circuit timing, among other things. The annotated netlist can also be modified to replace the applied resistance and capacitance values with nominal or zero values to recover the nominal netlist, which then can be used to verify designed circuit connectivity and functionality.

One or more embodiments of the invention or elements thereof can be implemented in the form of a computer product including a non-transitory computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

The invention will be described with respect to specific embodiments thereof, and reference will be made to the drawings, in which:

FIG. 8 illustrates an example nominal netlist for a multi-fin FinFET inverter described by the layout in FIG. 4.

FIG. 10 illustrates an example annotated netlist produced by the netlist annotator in FIG. 2 for a multi-fin FinFET inverter described by the layout in FIG. 4.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. A detailed description of embodiments of the present invention is provided with reference to the FIGS. 1-11.

Overall Design Process Flow

Figure 1:
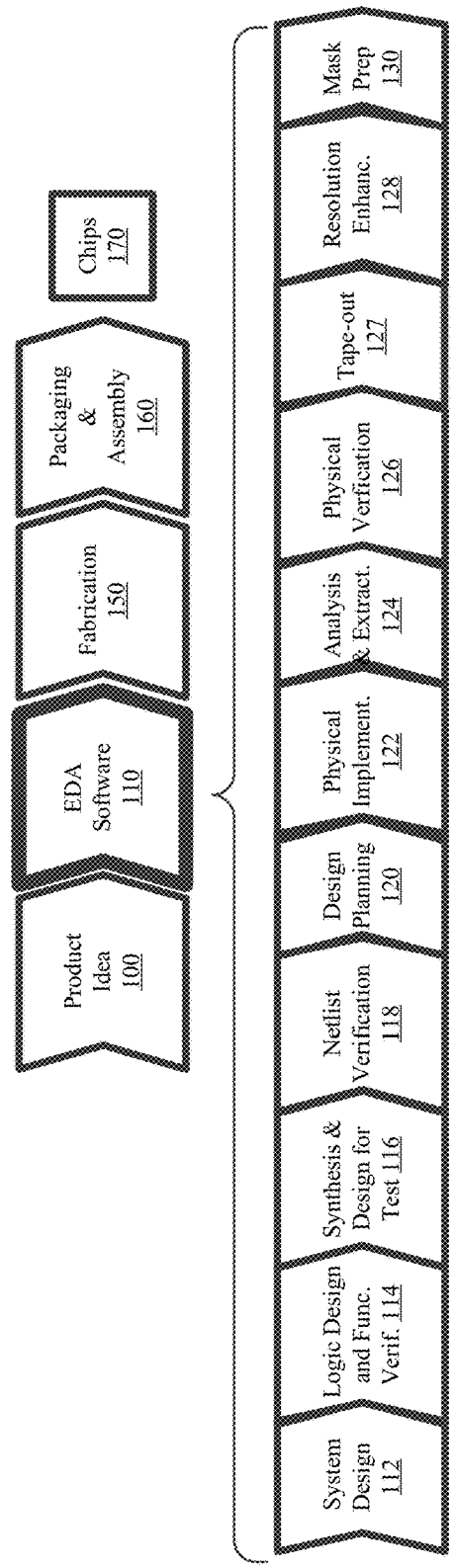
FIG. 1 illustrates EDA tools and process flow for integrated circuit design and manufacturing.

Aspects of the invention can be used to support an integrated circuit design flow. FIG. 1 shows a simplified representation of an illustrative digital integrated circuit design flow. At a high level, the process starts with the product idea (step 100) and is realized in an EDA (Electronic Design Automation) software design process (step 110). When the design is finalized, it can be taped-out (step 127). At some point after tape out, the fabrication process (step 150) and packaging and assembly processes (step 160) occur resulting, ultimately, in finished integrated circuit chips (result 170).

The EDA software design process (step 110) is itself composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) will now be provided.

System design (step 112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, System Studio, and DesignWare® products.

Logic design and functional verification (step 114): At this stage, the VHDL or Verilog code for modules in the system is written, and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products.

Netlist verification (step 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 120): Here, an overall floor plan for the chip is constructed and analyzed for timing and top-level routing. Example EDA software products from Synopsys, Inc. that can be used at this step include Astro and Custom Designer products.

Physical implementation (step 122): The placement (positioning of circuit elements) and routing (connection of the same) occurs at this step, as can selection of library cells to perform specified logic functions. Example EDA software products from Synopsys, Inc. that can be used at this step include the Astro, IC Compiler, and Custom Designer products.

Analysis and extraction (step 124): At this step, the circuit function is verified at a transistor level, this, in turn, permits what-if refinement. Example EDA software products from Synopsys, Inc. that can be used at this step include Astro-Rail, PrimeRail, PrimeTime, and Star-RCXT products.

Physical verification (step 126): At this step, various checking functions are performed to ensure correctness for manufacturing, electrical issues, lithographic issues, and circuitry. Example EDA software products from Synopsys, Inc. that can be used at this step include the Hercules product.

Tape-out (step 127): This step provides the "tape out" data to be used (after lithographic enhancements are applied if appropriate) for production of masks for lithographic use to produce finished chips. Example EDA software products from Synopsys, Inc. that can be used at this step include the IC Compiler and Custom Designer families of products.

Resolution enhancement (step 128): This step involves geometric manipulations of the layout to improve manufacturability of the design. Example EDA software products from Synopsys, Inc. that can be used at this step include Proteus, ProteusAF, and PSMGen products.

Mask data preparation (step 130): This step provides mask-making-ready "tape-out" data for production of masks for lithographic use to produce finished chips. Example EDA software products from Synopsys, Inc. that can be used at this step include the CATS(R) family of products. The method for actually making the masks can use any mask making technique, either known today or developed in the future. As an example, masks can be printed using techniques set forth in U.S. Pat. Nos. 6,096,458; 6,057,063; 5,246,800; 5,472,814; and 5,702,847, all incorporated by referenced herein for their teachings of mask printing techniques.

Once the process flow is ready, it can be used for manufacturing multiple circuit designs coming from various designers in various companies. The EDA flow 112-130 will be used by such designers. A combination of the process flow and the masks made from step 130 are used to manufacture any particular circuit.

Design Technology Co-Optimization Process Flow

Design Technology Co-Optimization (DTCO) process flow provides a simulation flow that enables technology development and design teams to evaluate various transistor and process options using a design technology co-optimization methodology that starts in the pre-wafer research phase. Using techniques described herein, the DTCO process flow takes into account parasitic interconnect resistance and capacitance. The DTCO process flow is used to evaluate the performance, power, area, and cost of a new or significantly modified IC fabrication technology. (Henceforth herein both types of fabrication technology are sometimes referred to simply as a "new" fabrication technology.) Achieving transistor performance and power targets of new IC technology requires consideration of new material options, and sometimes also new device architectures. Parasitic resistance and capacitance of interconnects are taken into account during the performance evaluation of the new technology.

Figure 2:
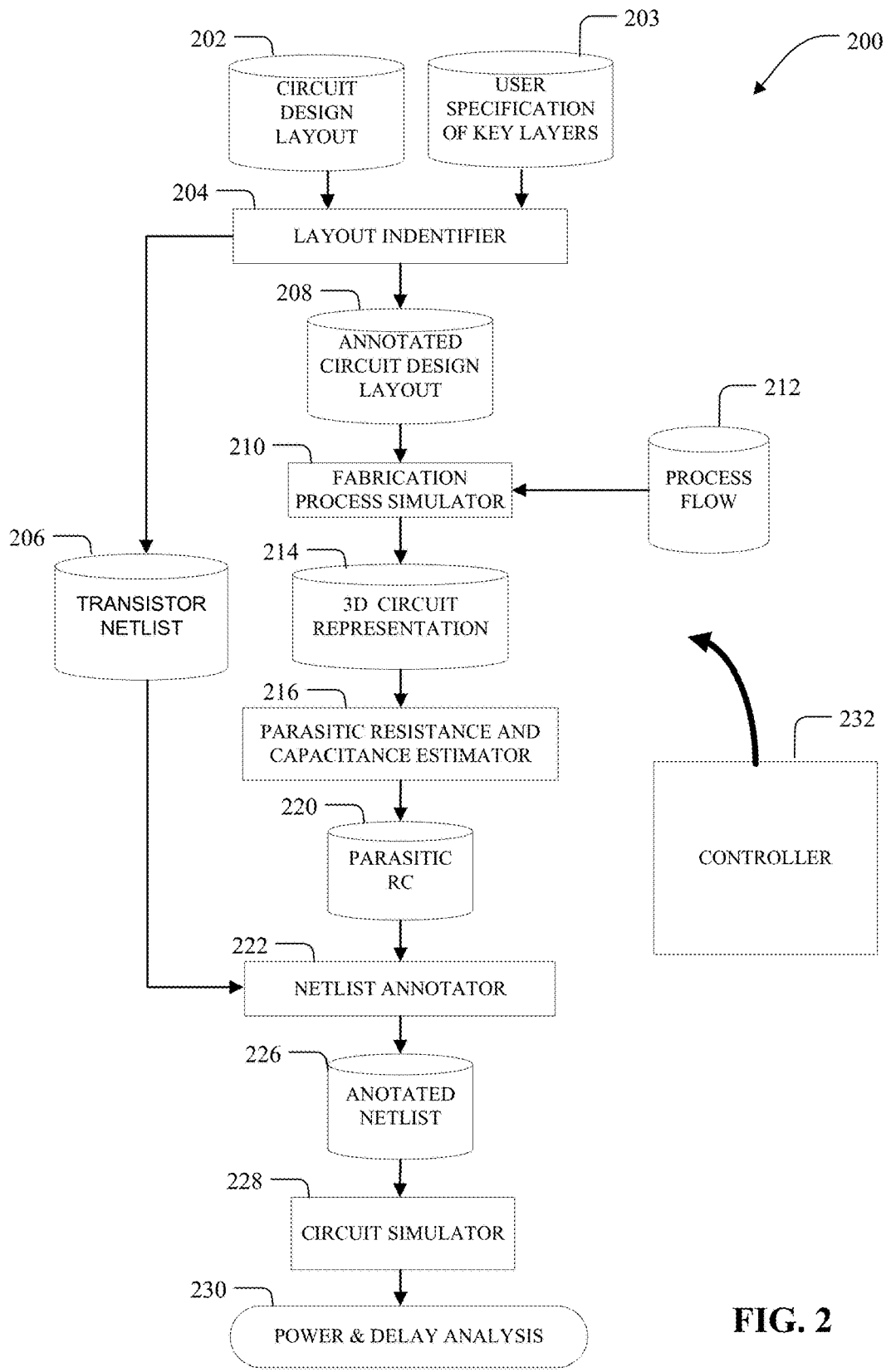
FIG. 2 illustrates design technology co-optimization process flow for integrated circuit design.

FIG. 2 illustrates an overall DTCO process flow 200 according to aspects of the invention. The DTCO process flow starts with the layout of a circuit design in database 202 and user specification of key layers 203 (e.g. the "17:0" layer is a "gate" layer, the "3:0" layer is a fin layer, etc.) in the layout of a circuit design in database 202. A circuit design is laid out using any desired layout software. Example products available from Synopsys, Inc. that can be used to layout a circuit design are Astro and CosmosLE. As used herein, a "circuit design" is a transistor level design, after synthesis from VHDL or equivalent and before layout. Additionally, it will be understood that a layout need not be of a complete circuit design, for example, if only a portion of the circuit is to be simulated at this time. A "layout" of a circuit design describes the layout "features," and that will eventually be used to define transistors, interconnects, and other functional and nonfunctional structures that will eventually appear on the integrated circuit device. The "features" include edges, materials, depths, and so on, that are specified by the layout to exist on the final integrated circuit. The transistor "geometry," as used herein, includes all the "layout features" that affect the calculations. Two sets of layout features are considered herein to be "different" if they differ in at least one aspect. The circuit design layout can be in any of several formats (e.g., GDSII, OASIS, TIF).

As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 2, the databases 202 and 203 can be a single combination database, or a combination of two or more separate databases. The databases 202 and 203 can be stored on a hard drive, a storage device or in a memory location or in one or more non-transitory computer readable media.

The circuit design layout 202 is of a circuit design. The circuit design includes at least one electronic device, at least one conductor, and at least one pin. Electronic devices are components for controlling the flow of electrical currents for the purpose of information processing, information storage, and system control. Examples of electronic devices include transistors, diodes, capacitors, and tunnel junctions. Electronic devices are connected to the circuit through their terminals, e.g., the gate, source, and drain of a transistor. For simplicity of discussion, the only kind of electronic device discussed in examples herein is a transistor. It will be appreciated that the concepts described herein apply equally well to circuit designs having other types of electronic devices.

Pins in the circuit design pass signals from and to other circuit designs and power supply lines. Transistors and pins in a circuit design are connected through metallic conductors referred to herein as interconnects, where the transistor terminals and pins act as the endpoints of interconnects. As used herein, "conductor" is a broader term than "interconnect." A design might include a metal region (conductor) which does not interconnect one terminal or pin to another. The system does not determine parasitic resistance in such a conductor, but they are nevertheless included because they can still affect parasitic capacitance. Also as used herein, an interconnect has one or more "endpoints." Endpoints include terminals of transistors and other electronic devices, as well as "pins," which are endpoints available for further connection to power or other circuit blocks.

Interconnects in an IC can span several layers, each layer separated from the previous layer by a dielectric. Where interconnections are required from one layer to another, an opening is formed through the intervening dielectric layer and filled with a conductive material. There are many variations on this structure. The interconnections between layers sometimes are referred to as 'vias' if they interconnect two metal interconnect layers. The interconnections between layers sometimes are referred to as 'contacts' if they connect the first metal interconnect layer to the silicon or gate layers in transistors. The first layer of metal is referred to herein as "metal 0", or M0 for short. For simplicity of discussion, no distinction is made herein between 'contacts' and 'vias,' and the two terms are used interchangeably herein. During fabrication, the M0 layer is formed over the underlying dielectric and then patterned to form individual conductors. The next dielectric layer is then formed above M0, vias are opened as required in this layer, and then a Metal 1 (M1) layer is formed and patterned. This process continues on up through M3, M4, and so on to the highest metal layer.

As used herein, the term "interconnect" includes conductors that may have only one endpoint. An interconnect with one endpoint may not carry a signal or current from one terminal or pin to another, but it still can affect the overall parasitic capacitance of the circuit design. In most embodiments, an interconnect can have two endpoints, e.g., an interconnect that connects pin $V_{DD}$ to the drain terminal of the P-type transistor in an inverter. In another embodiment, an interconnect can have more than two endpoints (e.g., fan-out, or power distribution).

Figure 3:
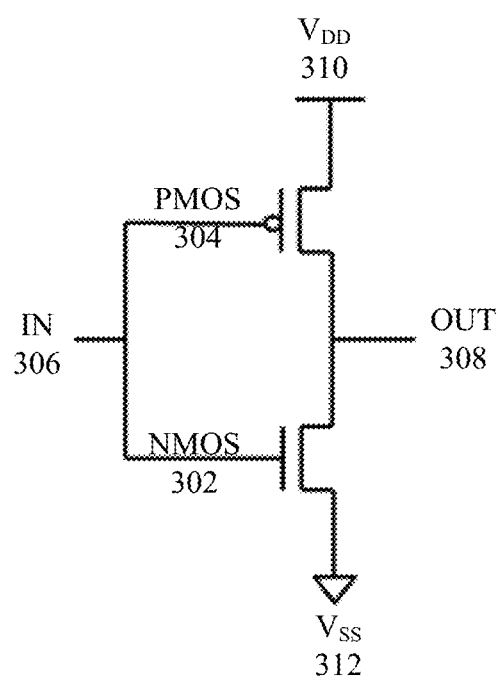
FIG. 3 illustrates an example circuit design of an inverter with N-type, and P-type multi-fin FinFETs used to describe a method of operation of the design technology co-optimization process flow.

The invention is described herein with the aid of an example circuit design of a multi-fin FinFET inverter as shown in the circuit diagram of FIG. 3. The inverter circuit design comprises two transistors: a "pull-down" N-type multi-fin FinFET transistor 302 and a "pull-up" P-type multi-fin FinFET transistor 304. Pins IN 306 and OUT 308 of the multi-fin FinFET inverter pass signals from and to other circuit designs. Pin $V_{DD}$ 310 is connected to the source terminal of the P-type transistor, and $V_{SS}$ 312 is connected to the source terminal of the N-type transistor in the multi-fin FinFET inverter. Interconnects present in the multi-fin FinFET inverter with their corresponding endpoints are: (i) interconnect between the pin $V_{DD}$ 310 and the source terminal of the P-type transistor 304, (ii) interconnect between the gate terminal of the N-type transistor 302, the gate terminal of the P-type transistor 304, and the pin IN, (iii) interconnect between the drain terminal of the N-type transistor 302, the drain terminal of the P-type transistor 304, and the pin OUT, and (iv) interconnect between pin the $V_{SS}$ 312 and the source terminal of the N-type transistor 302.

Referring to FIG. 2, the layout identifier module 204 extracts front end of line (FEOL) structures from circuit design layout 202, identifies all the transistor terminals and labels them. It also extracts back end of line (BEOL) structures from higher layers of the layout file, and matches, where metal meets silicon to match transistor terminals to metal contacts Pins, are already included as a part of the circuit design layout. A pin layer is a physical layer in the circuit design layout that carries pin labels. The layout identifier module 204 extracts the pin locations and labels from the circuit design layout 202. The layout identifier module 204 outputs an annotated circuit design layout 208 in which all the transistor terminals and pins are labeled. As explained elsewhere herein, the pin and transistor terminal labels and positions can be used to identify the corresponding interconnect endpoints. The layout identifier module 204 also derives a nominal netlist 206 from the same information. In one embodiment the derived nominal netlist 206 lists the transistors only, including channel width and gate length. In another embodiment where FinFETs are included in the circuit design, the number of fins for each FinFET transistor is also included in the nominal netlist 206. A netlist is a text description of connectivity between different components in a circuit design, such as transistor terminals and pins. The nominal netlist can be in any of several formats (e.g., EDIF, ASCII, RINF, EDIF 2, PADS PCB, Protel, etc.).

Example EDA software products from Synopsys, Inc. that can be used to implement the layout identifier module 204 include "IC WorkBench Edit/View Plus" (ICWBEV+) tool.

The annotated circuit design layout 208 is provided to a fabrication process simulator 210, which emulates the various fabrication steps of the target process flow 212 to simulate the fabrication of a circuit design according to the layout 208. The process flow 212 provides sufficient description of the target fabrication process so that it can be emulated in a simulator. Example EDA software products from Synopsys, Inc. that can be used as the fabrication process emulator 210 include "Sentaurus Process Explorer." In another embodiment, a fabrication process simulator with much greater precision can be used, such as Sentaurus Process, but such high precision is often not necessary at this stage and can be very time consuming, especially if the 3-D structure is large.

The output of the fabrication process simulator 210 is a representation of the 3-D circuit representation 214 of the circuit design after the fabrication process completes. The 3-D circuit representation 214 indicates the surfaces and interfaces among different materials in the structure, and takes account of line edge variation and corner rounding from photolithographic patterning and etching.

The 3-D circuit representation 214 is provided to a parasitic resistance and capacitance estimator 216. The parasitic resistance and capacitance estimator 216 may include a field solver that calculates the parasitic resistance and capacitance 220 by simulating current flows through the interconnects endpoints in the 3-D circuit representation 214.

The parasitic resistance and capacitance 220 from the parasitic resistance and capacitance estimator 216 is then provided a netlist annotator 222. The netlist annotator 222 assembles the resistance and capacitance parasitics 220 and includes it into the nominal netlist 206 to form an annotated netlist 226, which includes realistic values for all resistance and capacitance parasitics. The annotated netlist 226 can be stored on a hard drive, a storage device or in a memory location or in one or more non-transitory computer readable media. The annotated netlist can be in any of several formats (e.g., EDIF, ASCII, RINF, EDIF 2, PADS PCB, Protel, etc.).

The annotated netlist 226 then can be used in a circuit simulator 228 such as HSPICE in order to permit a designer to analyze circuit designs at a transistor level in module 230. By analyzing the performance of the transistors in the layout taking process variation into account, the designer is able to develop better designs.

If necessary, fabrication process engineers can modify the fabrication process recipe, and then re-run parts or all of the DTCO design flow 200 in order to iteratively optimize the new process for various goals including desired transistor performance.

Referring to FIG. 2, the sequence of operation of the layout identifier 204, the fabrication process simulator 210, the parasitic resistance and capacitance estimator 216, the netlist annotator 222, and even the circuit simulator 228 can be controlled automatically by a flow controller 232. Flow controller 232 may be a module that executes scripts to call each of the individual processing modules in the sequence set forth in FIG. 2, and defines the data flow among them. Flow controller 232 may be implemented, for example, with Sentaurus Workbench, available from Synopsys, Inc.

Figure 4A:
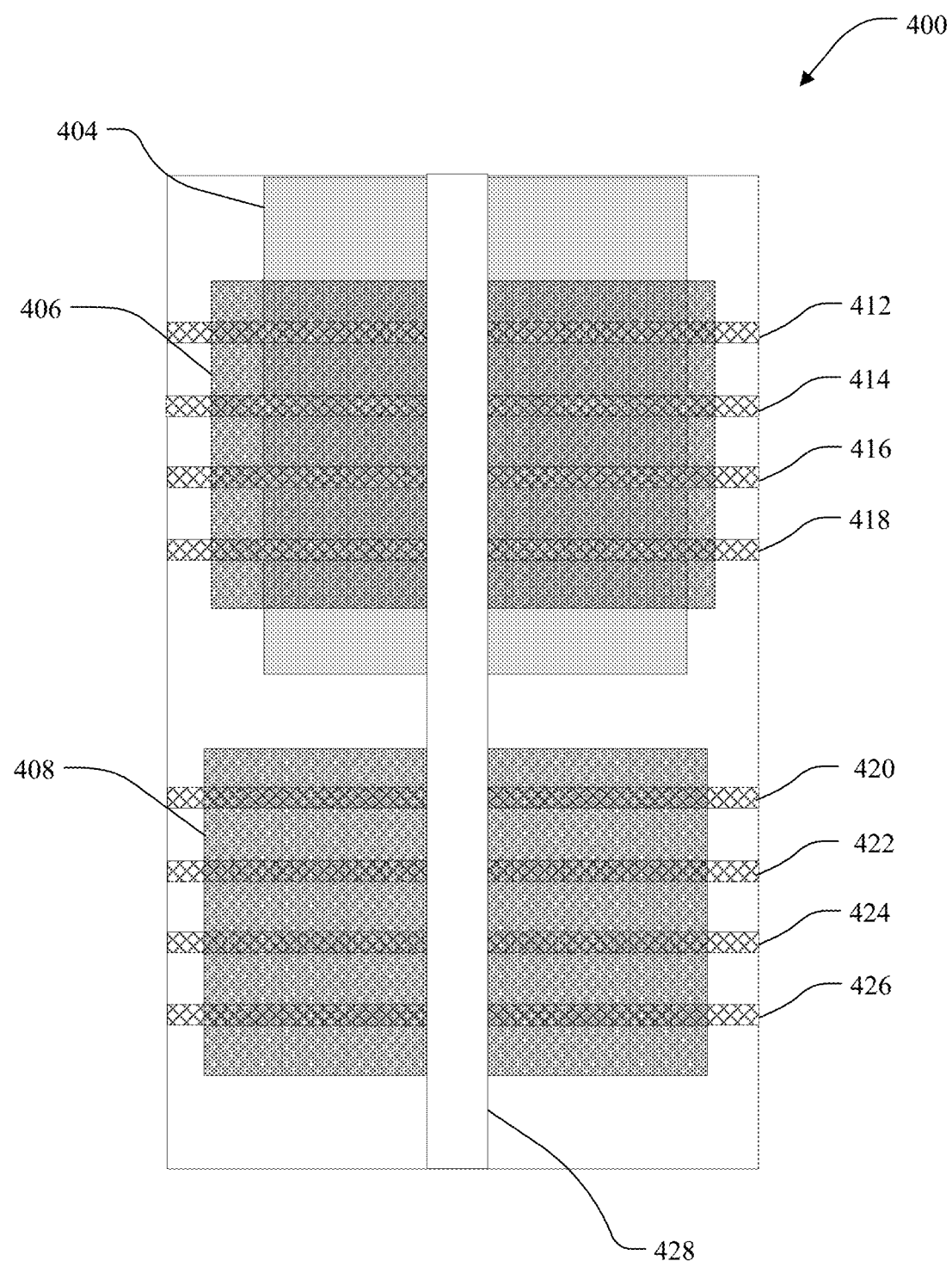
FIG. 4 (including FIGS. 4A and 4B collectively) illustrates user specified key layers in the layout of an inverter with N-type and P-type multi-fin FinFETs.
Figure 4B:
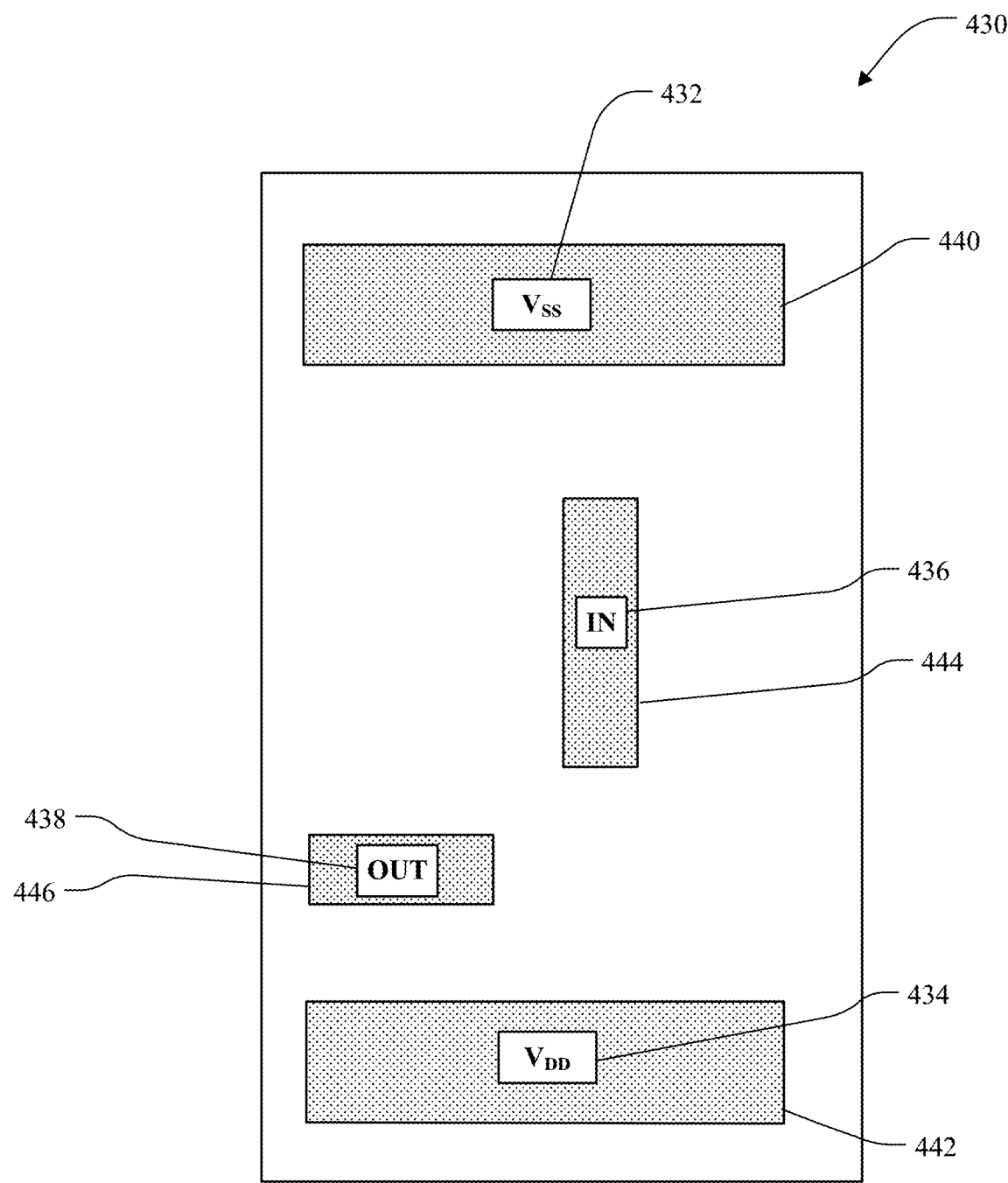

FIGS. 4A and 4B collectively illustrate user specified key layers 400 and 430 in the circuit design layout of an inverter with N-type and P-type multi-fin FinFETs. Referring to FIG. 4A, the N-type, and P-type multi-fin FinFETs each include four fins. An integrated circuit typically includes a P-doped semiconducting substrate. N-type transistors can be fabricated on the P-doped substrate. An N-well is formed in the P-doped semiconducting substrate to form P-type transistors.

An N-well geometry 404 is used to define the N-well region of the multi-fin FinFET inverter. The P-type multi-fin FinFET transistor is formed in N-well while the N-type transistor is formed in the multi-fin FinFET P-doped substrate. P-type fin geometries 412, 414, 416 and 418 are used to define the fins in N-well, and N-type fin geometries 420, 422, 424 and 426 are used to define the fins in the P-doped substrate. A P-type active region geometry 406 and an N-type active region geometry 408 are used to define a P-type active region and an N-type active region respectively. The N-type active region geometry 408 on top of the P-doped substrate and the P-type active region geometry 406 on top of the N-well are used to form source/drain regions of the transistors. The N-type action region geometry 408 forms N-type sources and drains, while the P-type action region geometry 406 forms P-type sources and drains. A gate conductor geometry 428 defines the gate of the N-type FinFET and P-type FinFET of the inverter. Additional key layers not included in FIG. 4 can define the pins geometries (topmost layer) of the inverter circuit.

FIG. 4B combines for illustration purpose both a shape layer that defines the shapes of the pins and a separate pin layer that labels the pins. The pin layer includes pin labels of pin $V_{SS}$ 432, pin $V_{DD}$ 434, pin IN 436, and pin OUT 438. The shape layer includes geometries for pin $V_{SS}$ 440, pin $V_{DD}$ 442, pin IN 444, and pin OUT 446.

Figure 5:
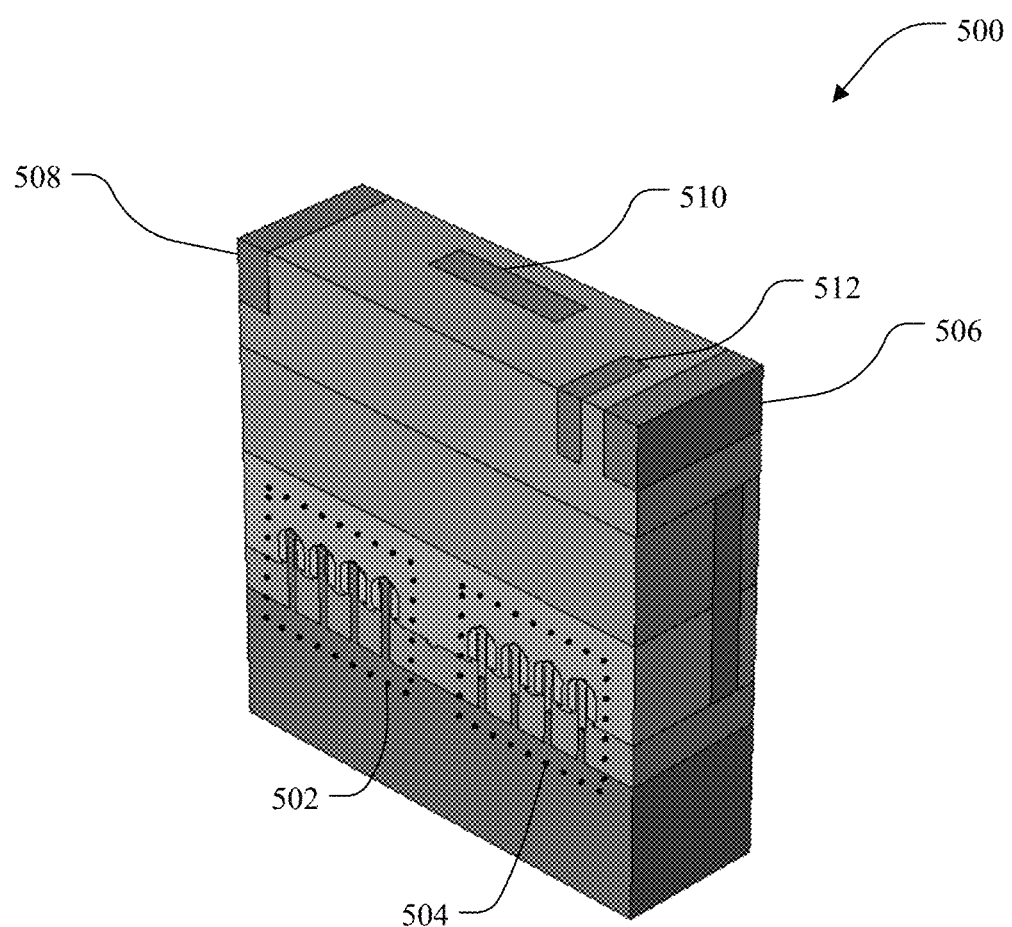
FIG. 5 illustrates a 3-D circuit representation created by the fabrication process simulator in FIG. 2 in accordance with the layout for a multi-fin FinFET inverter in FIG. 4 and a specified fabrication process flow specified in FIG. 2.

FIG. 5 illustrates a 3-D circuit representation 500 created by the fabrication process simulator 210 in FIG. 2 in accordance with the layout 400 for a multi-fin FinFET inverter in FIG. 4 and the fabrication process flow specified in database 212 in FIG. 2. The 3-D circuit representation 500 comprises an N-type multi-fin FinFET 502 and a P-type multi-fin FinFET 504. Pin $V_{DD}$ 506, pin $V_{SS}$ 508, pin IN 510, and pin OUT 512 are located on the top surface of the structure.

Figure 6:
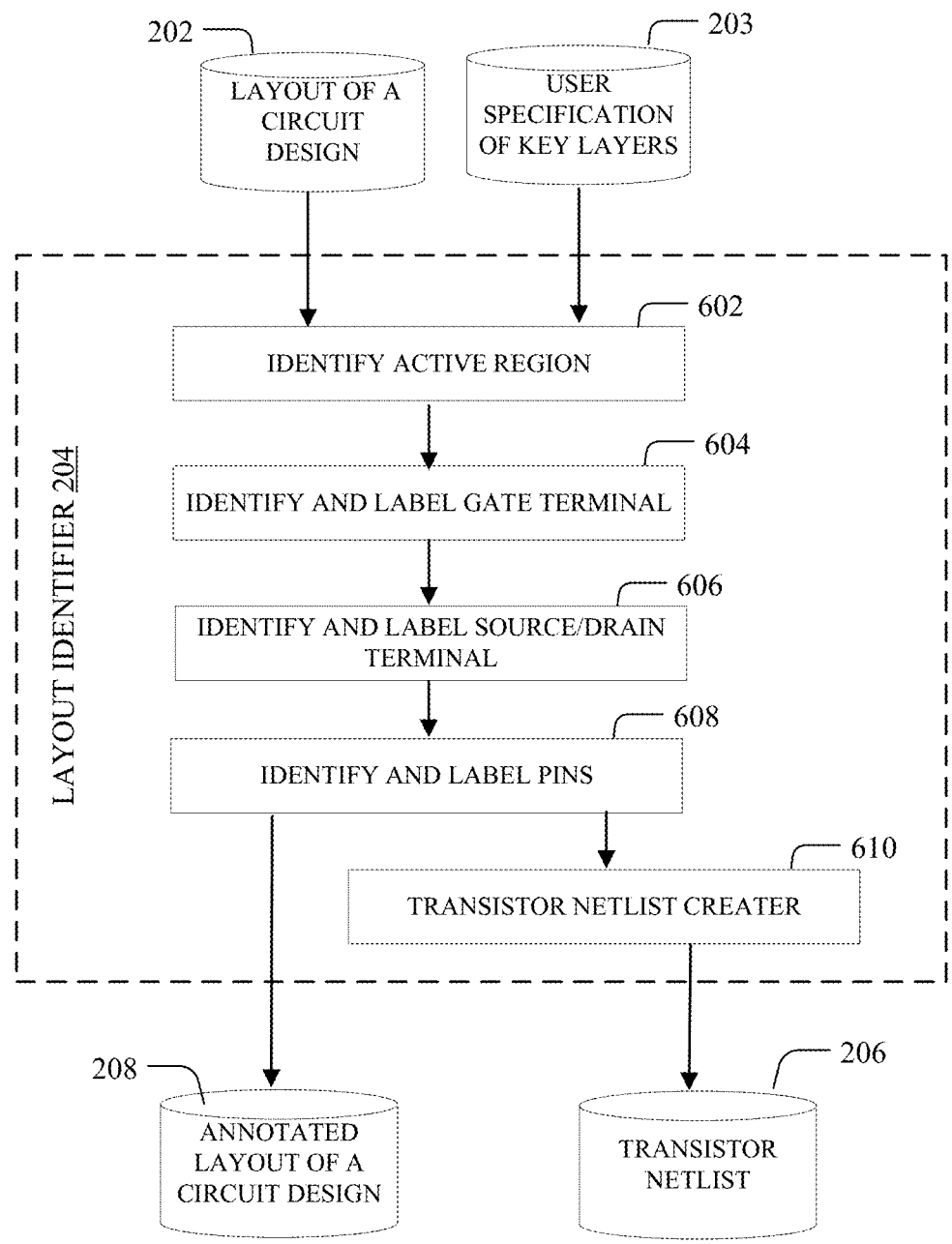
FIG. 6 illustrates a flowchart detail of the layout identifier of the design technology co-optimization process flow in FIG. 2.

FIG. 6 illustrates the flowchart detail of the layout identifier 204 of the design technology co-optimization process flow 200 in FIG. 2. The circuit design layout 202 and key layers specified by a user 203 are provided to the layout identifier module 204. Active N-type and P-type regions are identified in module 602. Gate regions and terminals are identified and labeled in module 604. Source/drain regions and terminals are identified and labeled in module 606. Pins are identified and labeled in module 608. An annotated circuit design layout 208 is one of the outputs of module 608. In the annotated circuit design layout 208, every transistor terminal and pin in the circuit design layout is labeled. Note that in another embodiment, the identifications of terminals, pins and interconnect endpoints can be output from the layout identifier module 204 in a form other than by annotation of the layout file.

After identifying and labeling the active regions, the gate regions, the source/drain regions, and the pins in module 602, 604 and 606 respectively, a nominal netlist creator 610 creates a nominal netlist 206 for the circuit design specified in the circuit design layout 202. In one embodiment the derived nominal netlist 206 includes nominal parasitic resistance and capacitance for its interconnects. In one embodiment the derived nominal netlist 206 lists the transistors only, omitting all interconnects.

Figure 7A:
FIG. 7 (including FIGS. 7A, 7B, 7C, and 7D, collectively) illustrates layout features useful for explaining a method of operation of the layout identifier of the design technology co-optimization process flow in FIG. 2 with layout 400 for a multi-fin FinFET inverter in FIG. 4 as an input.

FIGS. 7A-D illustrate layout features useful for explaining a method of operation of the layout identifier 204 of the design technology co-optimization process flow 200 in FIG. 2 with the layout 400 for a multi-fin FinFET inverter in FIG. 4 as an input. FIG. 7A illustrates identification of a bounding box 7A02 of the inverter cell by module 602 in layout identifier 204 in FIG. 6. The bounding box 7A02 contains the active regions of the substrate. In one embodiment, the bounding box 7A02 may be user-defined.

Figure 7B:
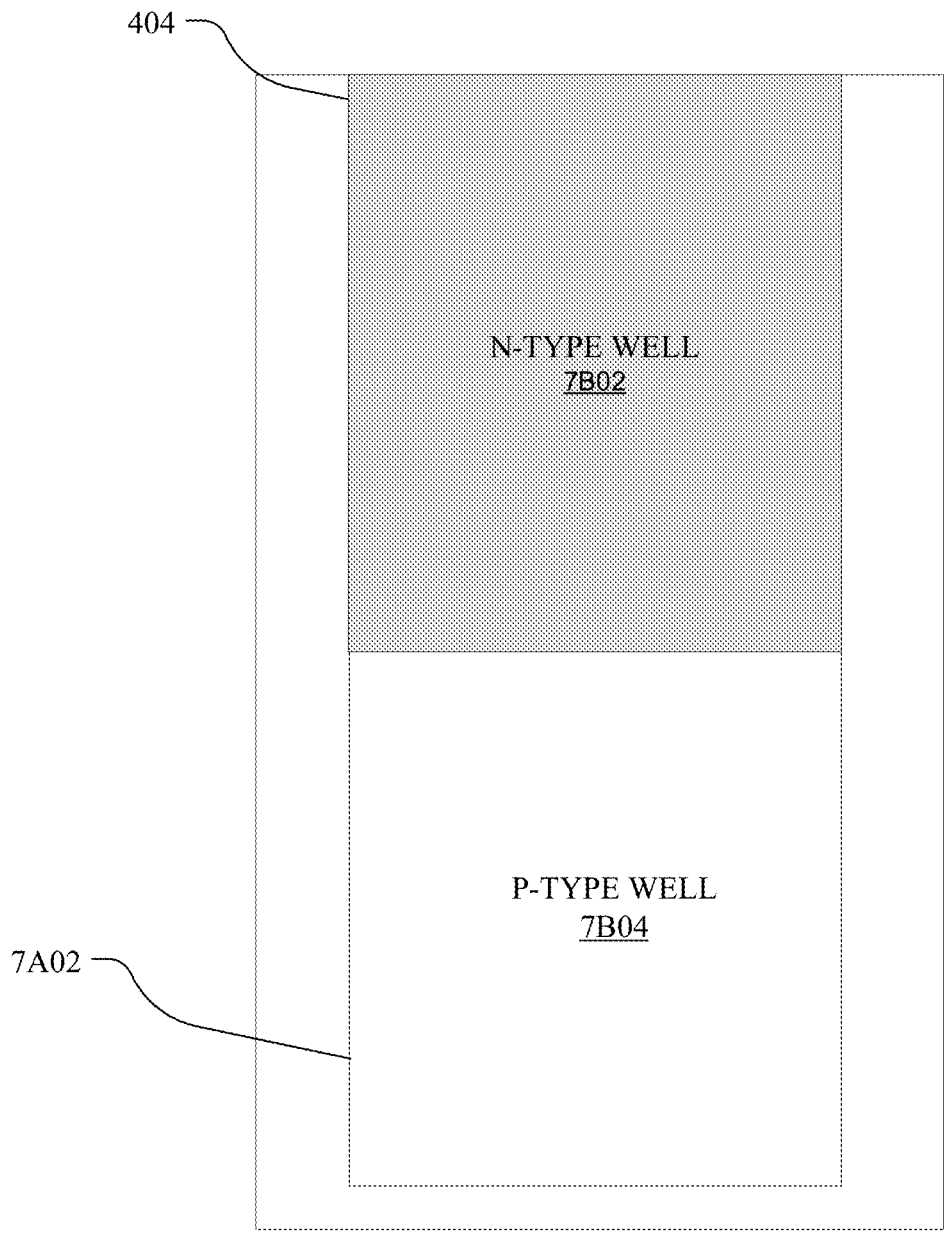

Module 602 further identifies N-type and P-type well regions of the inverter cell as illustrated in FIG. 7B. The intersection of the N-well geometry 404 and the bounding box 7A02 form an N-type well 7B02. Any area in the bounding box 7A02 not in alignment with the N-well geometry 404 forms a P-type well 7B04. As used herein, the term "N-well geometry" is used as a shorthand substitute for "the region of the N-well-defining layout layer that defines the chip regions in which N-wells will be formed." Similar shorthands are used herein for the terms "active region geometry" and "fin geometry."

Figure 7C:
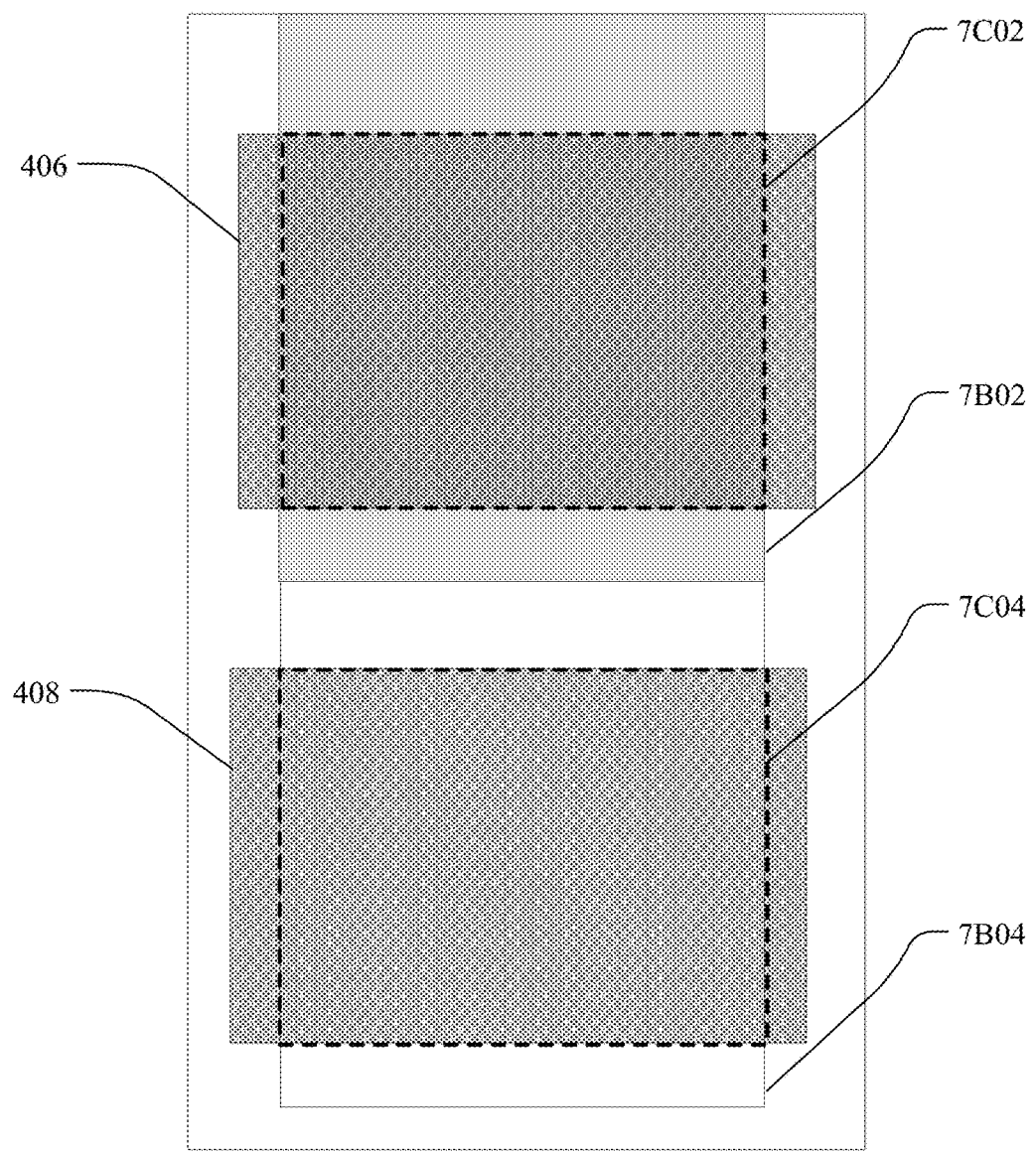

Module 602 then identifies N-type and P-type active regions of the inverter cell as illustrated in FIG. 7C. The intersection of the P-type active region geometry 406 and the N-type well 7B02 forms a P-type active region 7C02. The intersection of the N-type active region geometry 408 and the P-type well 7B04 forms an N-type active region 7C04.

Figure 7D:
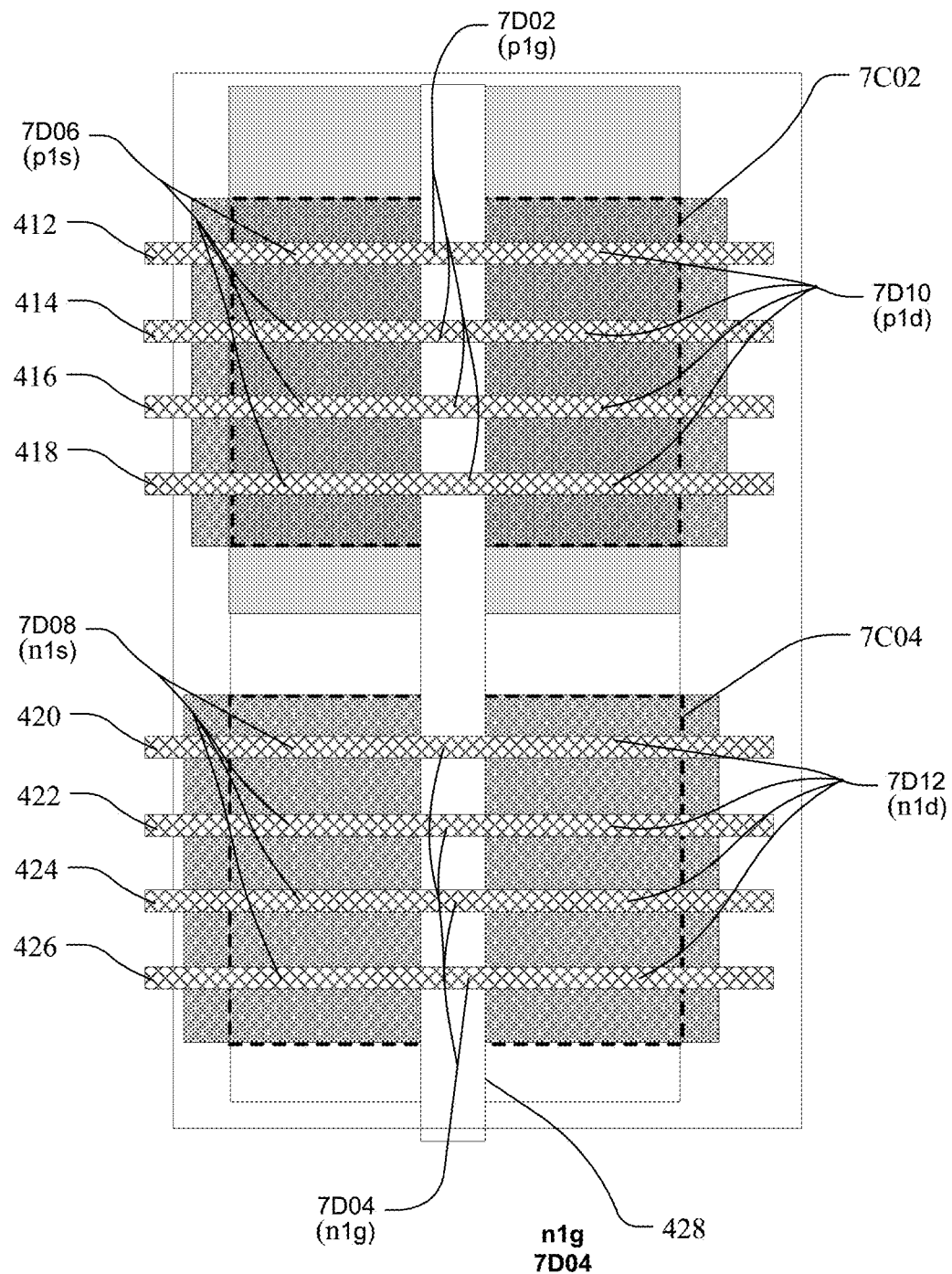

After the P-type action region 7C02 and N-type active region 7C04 are identified in module 602, module 604 identifies the gate regions in the inverter cell as illustrated in FIG. 7D. The intersection of the P-type active region 7C02, the P-type fin geometries 412, 414, 416 and 418, and the gate conductor geometry 428 form the P-type gate region 7D02. The P-type gate region 7D02 is labeled as gate terminal p1g. The intersection of the N-type active region 7C04, the P-type fin geometries 420, 422, 424 and 426, and the gate conductor geometry 428 form the N-type gate region 7D04. The N-type gate region 7D04 is labeled as gate terminal n1g.

After the gate regions are identified in module 604, source/drain regions of the inverter cell are identified and labeled by module 606 of the layout identifier 204 as illustrated in FIG. 7D. The intersection of the P-type active region 7C02 and the P-type fin geometries 412, 414, 416 and 418, form the P-type source region 7D06 and the P-type drain region 7D10. The P-type source region 7D06 is labeled as source terminal p1s, and the P-type drain region 7D10 is labeled as drain terminal p1d. The intersection of the N-type active region 7C04, and the N-type fin masks 420, 422, 424 and 426, form the N-type source region 7D08 and the N-type drain region 7D12. The N-type source region 7D08 is labeled as source terminal n1s, and the N-type drain region 7D12 is labeled as drain terminal n1d.

If planar transistors are present in the circuit design layout 202, gate regions are identified by the intersection of a gate mask and an active region mask. The active region to the right or the left of the gate region is identified as the source region and the active region on the other side of the gate region is identified as the drain region.

Module 608 then extracts the pin labels from the pin layer in FIG. 4B.

The location of each transistor terminal can be specified in a number of different ways. In one embodiment, the labeled gate, source and drain transistor terminals and pins are stored in the annotated circuit design layout 208 as text objects. The labeled gate, source and drain transistor terminals and pins are stored by the Cartesian coordinate system in two-dimensional space (x and y). The stored 2D coordinates of the transistor terminal labels and the pin labels are used as endpoints for resistance and capacitance extractions in module 216. The z components of the endpoint positions are deduced from a user specification of key layers 203 in the circuit design layout 202. For example, if the user specifies that a transistor drain terminal label "p1$d$" should be placed at the interface between material1 and material2, the height of that interface can be deduced from the 3-D circuit representation 214.

FIG. 8 illustrates the nominal netlist derived by the layout identifier 204 for the multi-fin FinFET inverter in layout 400 in FIG. 3. The P-type FinFET mp1 has four fins (nfin=4) and each of the FinFET channel has a length of 0.016 μm (l=0.016 u) and width of 0.008 μm (w=0.008 u). The inverter has a P-type multi-fin FinFET mp1 with transistor drain terminal p1$d$ 7D06, gate terminal p1$g$ 7D02 and drain terminal p1$d$ 7D10. The behavior of the P-type FinFET is described by Berkeley Short-Channel IGFET (BSIM) model pmos1. The inverter also has a multi-fin N-type FinFET mn1 with transistor drain terminal n1d 7D08, gate terminal n1g 7D04 and drain terminal n1$d$ 7D12. The N-type FinFET np1 has four fins (nfin=4) and each of the channel has a length of 0.016 μm (l=0.016 u) and width of 0.008 μm (w=0.008 u). The behavior of the N-type FinFET is described by a BSIM model nmos1.

Figure 9:
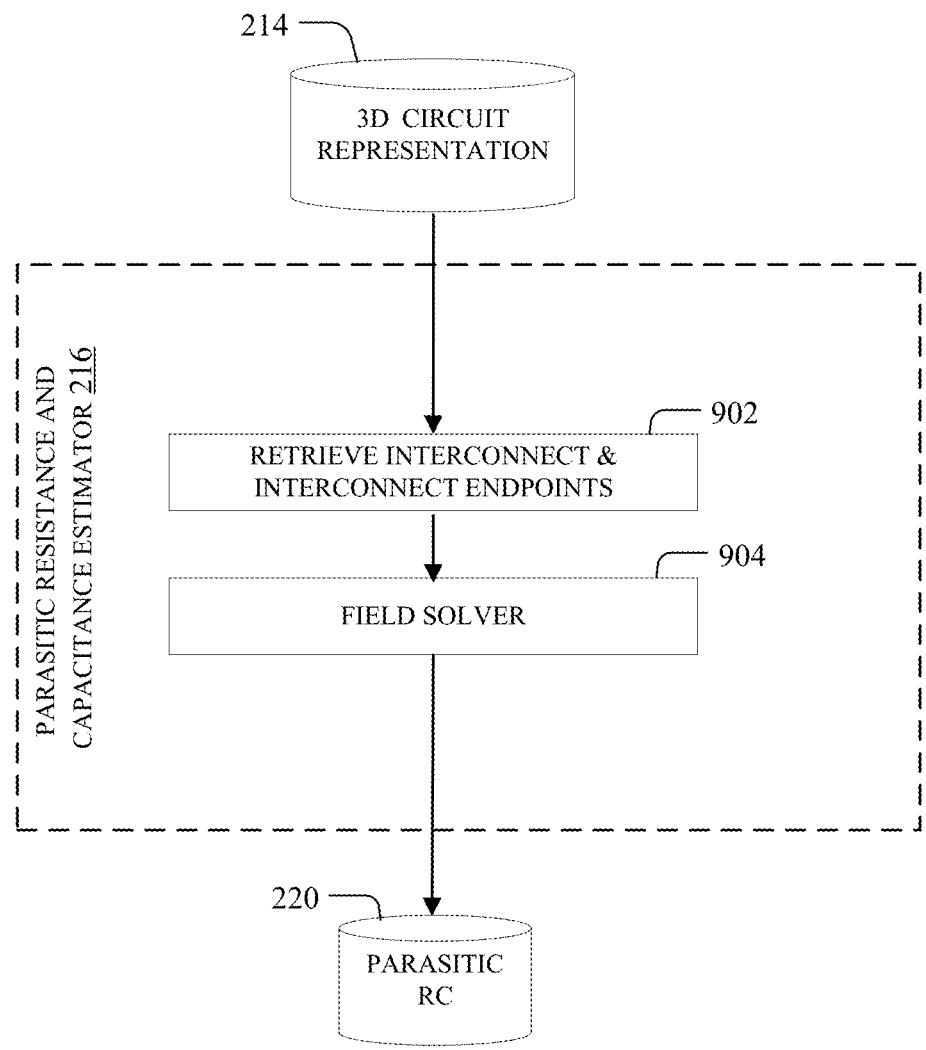
FIG. 9 illustrates a flowchart detail of the parasitic resistance and capacitance estimator of the design technology co-optimization process flow in FIG. 2.

FIG. 9 illustrates a flowchart detail of the parasitic resistance and capacitance estimator 216 of the design technology co-optimization process flow 200 in FIG. 2. A 3-D circuit representation 214 is provided to the parasitic resistance and capacitance estimator 216. The transistor terminals and pins in the 3-D circuit representation 214 are labeled and will be treated as interconnect endpoints in the parasitic resistance and capacitance estimator 216. In module 902, interconnects and their corresponding endpoints specified in the 3-D circuit representation 214 are retrieved. A field solver 904 calculates the parasitic resistance in the interconnects by simulating electric current flow through the interconnect endpoints in 3-D circuit representation 214. The field solver 904 can calculate the resistance of arbitrary interconnect shapes, including interconnect shape distortions due to lithography effects, line edge roughness, and etch/deposition chemistry and micro-loading effects. In another embodiment, the field solver 904 can be replaced by a phenomenological model where the resistance of an interconnect is estimated by a function dependent on the dimensions and material of the interconnect, as described in U.S. Provisional Application No. 62/465,638. The field solver 904 also calculates the capacitance between interconnects where at least one of the interconnect endpoints is a pin. The calculated interconnect resistances and capacitances between interconnects are reported in the parasitic resistance and capacitance database 220. Example EDA software products from Synopsys, Inc. that can be used for the field solver 904 include "Raphael."

The parasitic resistance and capacitance 220 calculated by the parasitic resistance and capacitance estimator 216 is then provided to a netlist annotator 222. The netlist annotator 222 assembles the resistance and capacitance parasitics 220 and includes it into the nominal netlist 206 to form an annotated netlist 226, which includes realistic values for all resistance and capacitance parasitics. FIG. 10 illustrates the annotated netlist produced by the netlist annotator 222 for a multi-fin FinFET inverter described by layout 400 in FIG. 3. The annotated netlist specifies the resistance value for every interconnect in the multi-fin FinFET inverter. For example, resistance R_0_1 in the interconnect with endpoints $V_{DD}$ and transistor source terminal p1$s$ is 5.0612 Ohm. The annotated netlist also specifies capacitances between any two interconnects present in the circuit design. For example, capacitance C_7_8 between interconnects with endpoints OUT and $V_{SS}$ is 0.076105 fF.

Hardware Implementation

Figure 11:
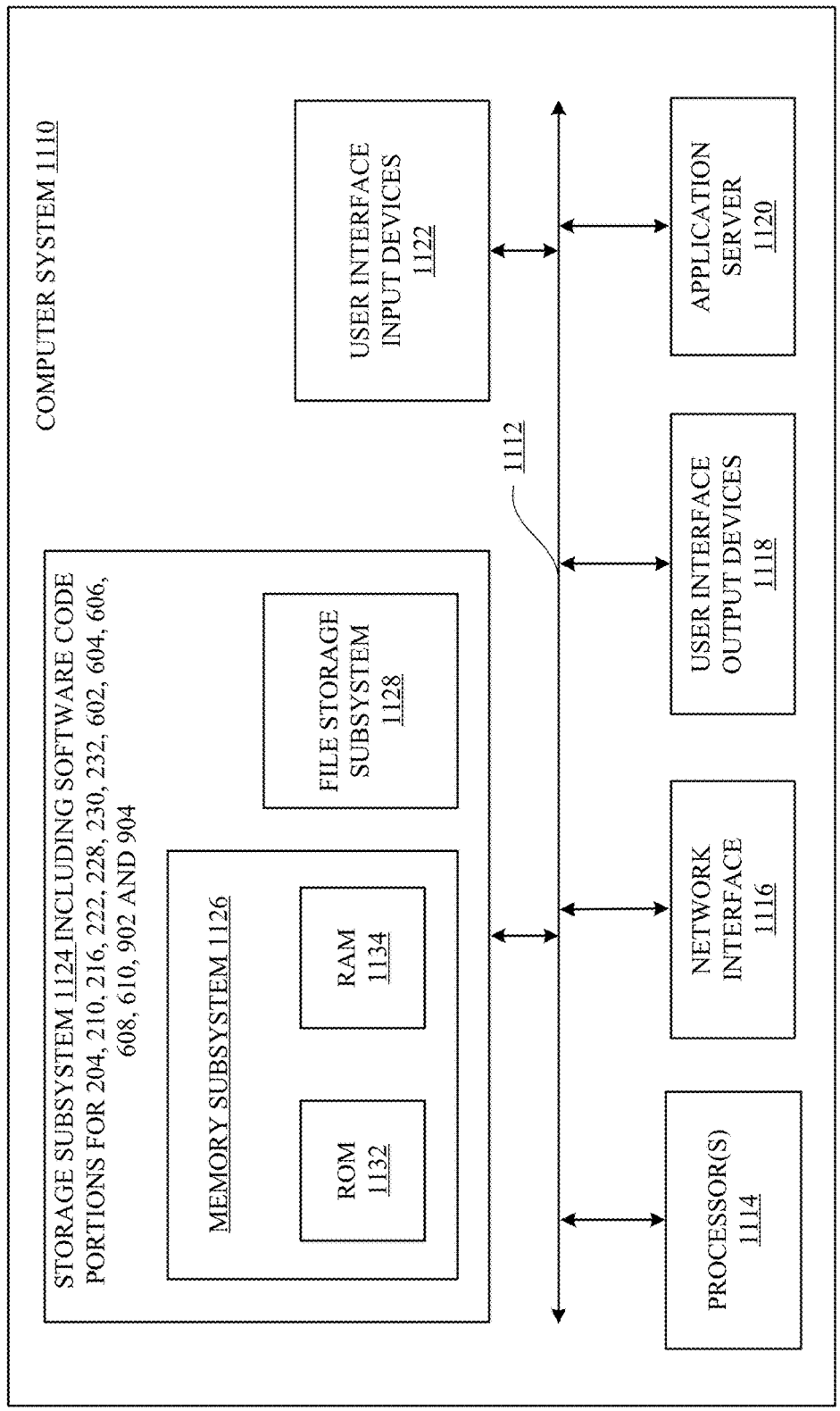
FIG. 11 is a simplified block diagram of a computer system.

FIG. 11 is a simplified block diagram of a computer system 1110 that can be used to implement any of the methods herein. Particularly it can be used to implement modules 204, 210, 216, 222, 228, 230, 232, 602, 604, 606, 608, 610, 902 and/or 904 in various embodiments. It also includes or accesses the databases 202, 203, 206, 208, 212, 214, 220, and/or 226.

Computer system 1110 typically includes a processor subsystem 1114 which communicates with a number of peripheral devices via bus subsystem 1112. These peripheral devices may include a storage subsystem 1124, comprising a memory subsystem 1126 and a file storage subsystem 1128, user interface input devices 1122, user interface output devices 1120, and a network interface subsystem 1116. The input and output devices allow user interaction with computer system 1110. Network interface subsystem 1116 provides an interface to outside networks, including an interface to the communication network 1118, and is coupled via communication network 1118 to corresponding interface devices in other computer systems. Communication network 1118 may comprise many interconnected computer systems and communication links. These communication links may be wireline links, optical links, wireless links, or any other mechanisms for communication of information, but typically it is an IP-based communication network. While in one embodiment, communication network 1118 is the Internet, in other embodiments, communication network 1118 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1110 or onto computer network 1118.

User interface output devices 1120 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide nonvisual display such as via audio output devices. In general, use of the term "output device" is intended to include all possible types of devices and ways to output information from computer system 1110 to the user or to another machine or computer system.

Storage subsystem 1124 stores the basic programming and data constructs that provide the functionality of certain embodiments of the present invention. For example, the various modules implementing the functionality of certain embodiments of the invention may be stored in storage subsystem 1124. These software modules are generally executed by processor subsystem 1114. The databases 202, 203, 206, 208, 212, 214, 220, and/or 226 may reside in storage subsystem 1124.

Memory subsystem 1126 typically includes a number of memories including a main random access memory (RAM) 1134 for storage of instructions and data during program execution and a read-only memory (ROM) 1132 in which fixed instructions are stored. File storage subsystem 1128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1128. The host memory 1126 contains, among other things, computer instructions which, when executed by the processor subsystem 1114, cause the computer system to operate or perform functions as described herein. As used herein, processes and software that are said to run in or on "the host" or "the computer," execute on the processor subsystem 1114 in response to computer instructions and data in the host memory subsystem 1126 including any other local or remote storage for such instructions and data.

Bus subsystem 1112 provides a mechanism for letting the various components and subsystems of computer system 1110 communicate with each other as intended. Although bus subsystem 1112 is shown schematically as a single bus, alternative embodiments of the bus subsystem may use multiple busses.

Computer system 1110 itself can be of varying types including a personal computer, a portable computer, a workstation, a computer terminal, a network computer, a television, a mainframe, a server farm, or any other data processing system or user device. Due to the ever-changing nature of computers and networks, the description of computer system 1110 depicted in FIG. 11 is intended only as a specific example for purposes of illustrating the preferred embodiments of the present invention. Many other configurations of computer system 1110 are possible having more or less components than the computer system depicted in FIG. 11.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time-varying signals in which the information is encoded in the way the signal varies over time.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for development of an integrated circuit fabrication process, the method comprising:
providing to a computer system a layout of a circuit design, the circuit design including at least one pin, at least one transistor and at least one conductor, at least one of the conductors being an interconnect, each of the interconnects having at least two endpoints, each of the endpoints being either a terminal of a transistor or a pin in the circuit design;
the computer system identifying, from the layout, locations for a plurality of transistors in the layout and a plurality of interconnect endpoints in the layout;
a computer system synthesizing by simulation of a fabrication process under test, a three-dimensional circuit representation fabricated in accordance with the layout of the circuit design, the three-dimensional circuit representation including at least the interconnects provided in the layout of the circuit design and the locations of the plurality of interconnect endpoints identified from the layout;
a computer system estimating, from the three-dimensional circuit representation, parasitic resistance values between at least one pair of the interconnect endpoints which share an interconnect;
a computer system estimating, from the three-dimensional circuit representation, parasitic capacitance values between at least one pair of the interconnect endpoints which are pins of the circuit design;
a computer system developing an annotated netlist that includes the plurality of the transistors identified from the layout and the plurality of the interconnects identified from the layout, and which further indicates the parasitic resistance values and parasitic capacitance values estimated from the three-dimensional circuit representation;

writing the annotated netlist into a storage device in conjunction with the parasitic resistance values and parasitic capacitance values; and applying the annotated netlist in a circuit simulator to produce an evaluation of the implementation of the circuit design in the fabrication process under test.

2. The method of claim 1, wherein identifying locations for a plurality of transistors in the layout and a plurality of interconnect endpoints in the layout comprises:

identifying a first one of the transistors in the layout; and identifying gate, source and drain terminals of the first transistor in the layout; and identifying locations of interconnect endpoints as X/Y coordinates of the gate, source and drain terminals of the first transistor.

3. The method of claim 2, wherein identifying gate, source and drain terminals of the first transistor comprises:

identifying as an active region of the first transistor, a region where an active region geometry identified in the layout intersects a predetermined bounding box of the layout;

identifying as the gate terminal of the first transistor, a region where a gate conductor geometry identified in the layout intersects the active region; and identifying as the source and drain terminals of the first transistor, respective portions of the active region on longitudinally opposite sides of the gate region.

4. The method of claim 3, further comprising naming the first transistor as a p-type transistor when the active region of the first transistor intersects an n-type well geometry identified in the layout.

5. The method of claim 3, further comprising naming the first transistor as an n-type transistor when the active region of the first transistor does not intersect an n-type well geometry identified in the layout.

6. The method of claim 2, wherein identifying gate, source and drain terminals of the first transistor comprises:

identifying as an active region of the first transistor, a region where an active region geometry identified in the layout intersects a predetermined bounding box of the layout;

identifying as gate terminals of the first transistor, regions where a gate conductor geometry and a plurality of fin geometries identified in the layout intersect the active region; and identifying as source and drain terminals of the first transistor, regions where the plurality of fin geometries intersect the active region, the source and drain terminals on longitudinally opposite sides of the gate terminals.

7. The method of claim 1, wherein identifying locations for a plurality of interconnect endpoints in the layout comprises identifying pins from a plurality of pin geometries identified in the layout.

8. The method of claim 1, wherein applying the annotated netlist in a circuit simulator to produce an evaluation of the implementation of the circuit design in the fabrication process under test comprises using the circuit simulator to estimate circuit timing.

9. The method of claim 1, wherein applying the annotated netlist in a circuit simulator to produce an evaluation of the implementation of the circuit design in the fabrication process under test comprises using the circuit simulator to estimate power consumption.

10. The method of claim 1, further comprising verifying designed circuit connectivity and functionality of the circuit design by:

removing the parasitic resistance values and the parasitic capacitance values from the annotated netlist, to develop a nominal netlist; and verifying the designed circuit connectivity and functionality using the nominal netlist.

11. The method of claim 1, further comprising, estimating, from the three-dimensional circuit representation, parasitic resistance values between each pair of the interconnect endpoints which share an interconnect.

12. The method of claim 1, further comprising, estimating, from the three-dimensional circuit representation, parasitic capacitance values between each pair of the interconnect endpoints which are pins of the circuit design.

13. The method of claim 1, wherein estimating parasitic resistance values between at least one pair of the interconnect endpoints which share an interconnect comprises simulating a current flow through the shared interconnect from one endpoint of the pair to the other endpoint of the pair in the three-dimensional circuit representation.

14. A system for aiding development of an integrated circuit fabrication process, the system comprising a memory and a data processor coupled to the memory, the data processor configured with:

a source of a layout of a circuit design, the circuit design including at least one pin, at least one transistor and at least one conductor, at least one of the conductors being an interconnect, each of the interconnects having at least two endpoints, each of the endpoints being either a terminal of a transistor of the circuit design or a pin of the circuit design;

a source of a description of a fabrication process under test;

a layout identifier;

a fabrication process simulator;

a parasitic resistance and capacitance estimator;

a netlist annotator; and a flow controller which is programmed to:

operate the layout identifier to identify, from the layout, locations for a plurality of transistors in the layout and a plurality of interconnect endpoints in the layout;

operate the fabrication process simulator to synthesize, by the fabrication process under test, a three-dimensional circuit representation fabricated in accordance with the layout of the circuit design, the three-dimensional circuit representation including at least the interconnects provided in the layout of the circuit design and the locations of the plurality of interconnect endpoints identified from the layout;

operate the parasitic resistance and capacitance estimator to estimate, from three-dimensional circuit representation, parasitic resistance values between at least one pair of the interconnect endpoints which share an interconnect;

operate the parasitic resistance and capacitance estimator to estimate, from the three-dimensional circuit representation, parasitic capacitance values between at least one pair of the interconnect endpoints which are pins of the circuit design;

operate the netlist annotator to develop an annotated netlist that includes the plurality of the transistors identified from the layout and the plurality of the interconnects identified from the layout, and which further indicates the parasitic resistance and parasitic capacitance values estimated from the three-dimensional circuit representation; and write the annotated netlist into a storage device in conjunction with the parasitic resistance values and parasitic capacitance values for use by a circuit simulator to produce an evaluation of the implementation of the circuit design in the fabrication process under test.

15. The system of claim 14, wherein in identifying locations for a plurality of transistors in the layout and a plurality of interconnect endpoints in the layout, the system:
identifies a first one of the transistors in the layout; and
identifies gate, source and drain terminals of the first transistor in the layout; and
identifies locations of interconnect endpoints as X/Y coordinates of the gate, source and drain terminals of the first transistor.

16. The system of claim 15, wherein in identifying gate, source and drain terminals of the first transistor, the system
identifies as an active region of the first transistor, a region where an active region geometry identified in the layout intersects a predetermined bounding box of the layout;
identifies as the gate terminal of the first transistor, a region where a gate conductor geometry identified in the layout intersects the active region; and
identifies as the source and drain terminals of the first transistor, respective portions of the active region on longitudinally opposite sides of the gate region.

17. The system of claim 16, wherein the system further names the first transistor as a p-type transistor when the active region of the first transistor intersects an n-type well geometry identified in the layout.

18. The system of claim 16, wherein the system further names the first transistor as an n-type transistor when the active region of the first transistor does not intersect an n-type well geometry identified in the layout.

19. The system of claim 15, wherein in identifying gate, source and drain terminals of the first transistor, the system:
identifies as an active region of the first transistor, a region where an active region geometry identified in the layout intersects a predetermined bounding box of the layout;
identifies as gate terminals of the first transistor, regions where a gate conductor geometry and a plurality of fin geometries identified in the layout intersect the active region; and
identifies as source and drain terminals of the first transistor, regions where the plurality of fin geometries intersect the active region, the source and drain terminals on longitudinally opposite sides of the gate terminals.

20. The system of claim 14, wherein in identifying locations for a plurality of interconnect endpoints in the layout, the system identifies pins from a plurality of pin geometries identified in the layout.

21. The system of claim 14, wherein the system applies the annotated netlist in a circuit simulator to produce an evaluation of the implementation of the circuit design in the fabrication process under test by using the circuit simulator to estimate circuit timing.

22. The system of claim 14, wherein the system applies the annotated netlist in a circuit simulator to produce an evaluation of the implementation of the circuit design in the fabrication process under test by using the circuit simulator to estimate power consumption.

23. The system of claim 14, wherein in verifying designed circuit connectivity and functionality of the circuit design, the system:
removes the parasitic resistance values and the parasitic capacitance values from the annotated netlist, to develop a nominal netlist; and
verifies the designed circuit connectivity and functionality using the nominal netlist.

24. The system of claim 14, wherein the system further estimates, from the three-dimensional circuit representation, parasitic resistance values between each pair of the interconnect endpoints which share an interconnect.

25. The system of claim 14, wherein the system further estimates, from the three-dimensional circuit representation, parasitic capacitance values between each pair of the interconnect endpoints which are pins of the circuit design.

26. The system of claim 14, wherein the system further estimates parasitic resistance values between at least one pair of the interconnect endpoints which share an interconnect comprises simulating a current flow through the shared interconnect from one endpoint of the pair to the other endpoint of the pair in the three-dimensional circuit representation.

27. A non-transitory computer readable medium having stored thereon a plurality of instructions which when executed by a processor aids development of an integrated circuit fabrication process when provided with a layout of a circuit design, the circuit design including at least one pin, at least one transistor and at least one conductor, at least one of the conductors being an interconnect, each of the interconnects having at least two endpoints, each of the endpoints being either a terminal of a transistor or a pin in the circuit design, the plurality of instructions comprising instructions that cause the processor to:
identify, from the layout, locations for a plurality of transistors in the layout and a plurality of interconnect endpoints in the layout;
synthesize by simulation of a fabrication process under test, a three-dimensional circuit representation fabricated in accordance with the layout of the circuit design, the three-dimensional circuit representation including at least the interconnects provided in the layout of the circuit design and the locations of the plurality of interconnect endpoints identified from the layout;
estimate, from the three-dimensional circuit representation, parasitic resistance values between at least one pair of the interconnect endpoints which share an interconnect;
estimate, from the three-dimensional circuit representation, parasitic capacitance values between at least one pair of the interconnect endpoints which are pins of the circuit design;
develop an annotated netlist that includes the plurality of the transistors identified from the layout and the plurality of the interconnects identified from the layout, and which further indicates the parasitic resistance values and parasitic capacitance values estimated from the three-dimensional circuit representation; and
write the annotated netlist into a storage device in conjunction with the parasitic resistance values and parasitic capacitance values for use by a circuit simulator to produce an evaluation of the implementation of the circuit design in the fabrication process under test.

28. The non-transitory computer readable medium of claim 27, wherein identifying locations for a plurality of transistors in the layout and a plurality of interconnect endpoints in the layout comprises:

identifying a first one of the transistors in the layout; and
identifying gate, source and drain terminals of the first transistor in the layout; and
identifying locations of interconnect endpoints as X/Y coordinates of the gate, source and drain terminals of the first transistor.

29. The non-transitory computer readable medium of claim 28, wherein identifying gate, source and drain terminals of the first transistor comprises:
   identifying as an active region of the first transistor, a region where an active region geometry identified in the layout intersects a predetermined bounding box of the layout;
   identifying as the gate terminal of the first transistor, a region where a gate conductor geometry identified in the layout intersects the active region; and
   identifying as the source and drain terminals of the first transistor, respective portions of the active region on longitudinally opposite sides of the gate region.

30. The non-transitory computer readable medium of claim 29, further comprising naming the first transistor as a p-type transistor when the active region of the first transistor intersects an n-type well geometry identified in the layout.

31. The non-transitory computer readable medium of claim 29, further comprising naming the first transistor as an n-type transistor when the active region of the first transistor does not intersect an n-type well geometry identified in the layout.

32. The non-transitory computer readable medium of claim 28, wherein identifying gate, source and drain terminals of the first transistor comprises:
   identifying as an active region of the first transistor, a region where an active region geometry identified in the layout intersects a predetermined bounding box of the layout;
   identifying as gate terminals of the first transistor, regions where a gate conductor geometry and a plurality of fin geometries identified in the layout intersect the active region; and
   identifying as source and drain terminals of the first transistor, regions where the plurality of fin geometries intersect the active region, the source and drain terminals on longitudinally opposite sides of the gate terminals.

33. The non-transitory computer readable medium of claim 27, wherein identifying locations for a plurality of interconnect endpoints in the layout comprises identifying pins from a plurality of pin geometries identified in the layout.

34. The non-transitory computer readable medium of claim 27, wherein applying the annotated netlist in a circuit simulator to produce an evaluation of the implementation of the circuit design in the fabrication process under test comprises using the circuit simulator to estimate circuit timing.

35. The non-transitory computer readable medium of claim 27, wherein applying the annotated netlist in a circuit simulator to produce an evaluation of the implementation of the circuit design in the fabrication process under test comprises using the circuit simulator to estimate power consumption.

36. The non-transitory computer readable medium of claim 27, further comprising verifying designed circuit connectivity and functionality of the circuit design by:
   removing the parasitic resistance values and the parasitic capacitance values from the annotated netlist, to develop a nominal netlist; and
   verifying the designed circuit connectivity and functionality using the nominal netlist.

37. The non-transitory computer readable medium of claim 27, further comprising, estimating, from the three-dimensional circuit representation, parasitic resistance values between each pair of the interconnect endpoints which share an interconnect.

38. The non-transitory computer readable medium of claim 27, further comprising, estimating, from the three-dimensional circuit representation, parasitic capacitance values between each pair of the interconnect endpoints which are pins of the circuit design.

39. The non-transitory computer readable medium of claim 27, wherein estimating parasitic resistance values between at least one pair of the interconnect endpoints which share an interconnect comprises simulating a current flow through the shared interconnect from one endpoint of the pair to the other endpoint of the pair in the three-dimensional circuit representation.

* * * * *